Feb. 21, 1956

H. E. HOOE 2,735,490

KEYSORT KEYPUNCH

Filed Sept. 25, 1951

INVENTOR.
HUNTER E. HOOE
BY
Mellin and Hanson
ATTORNEYS

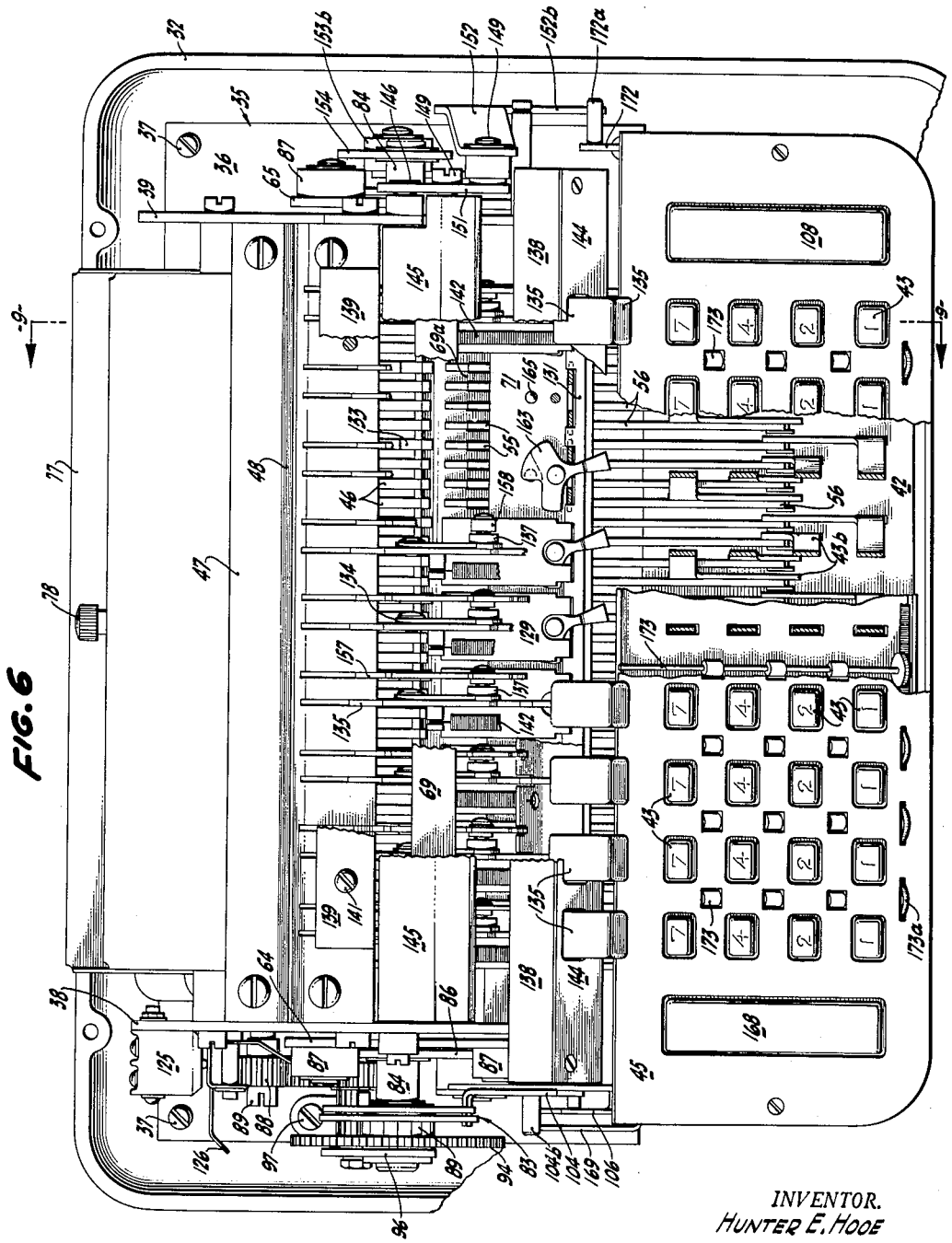

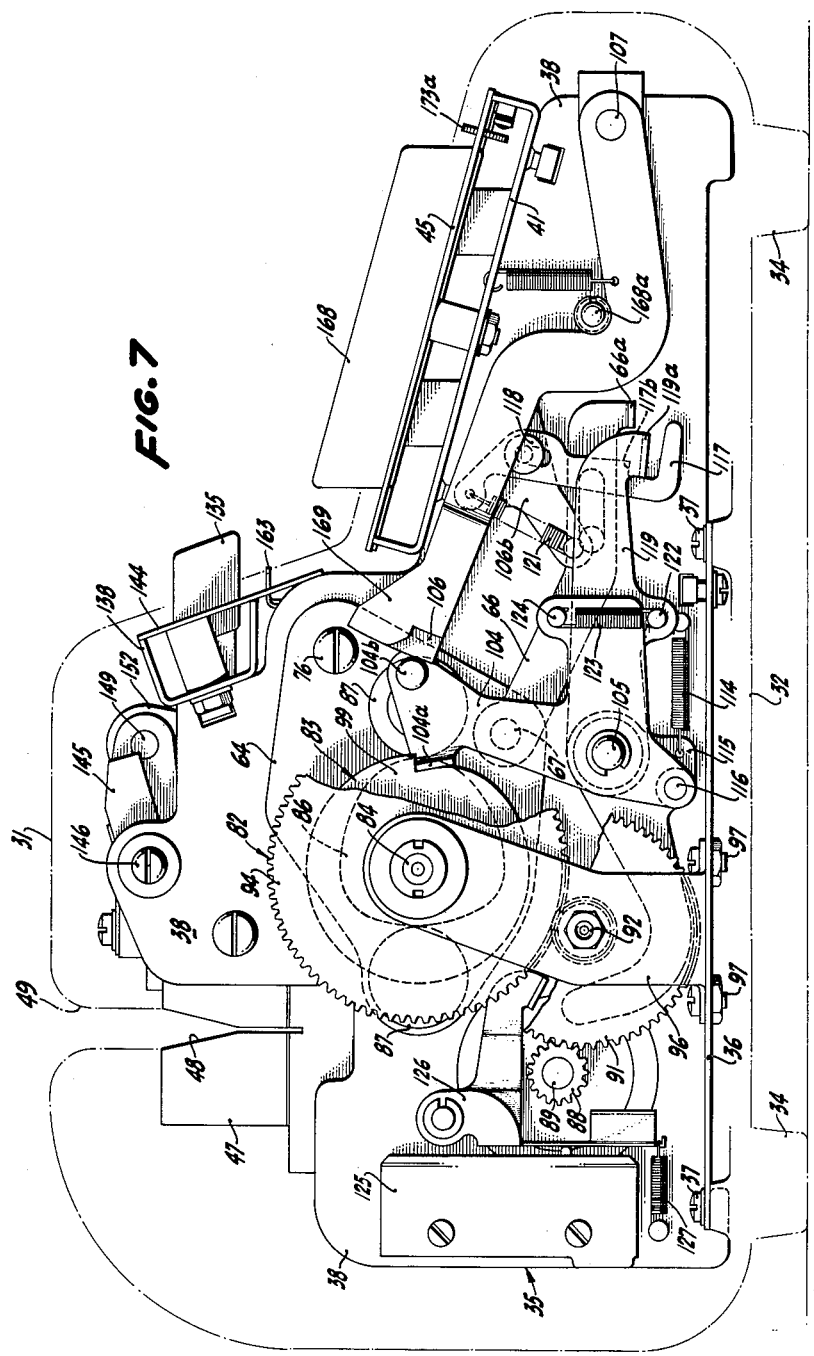

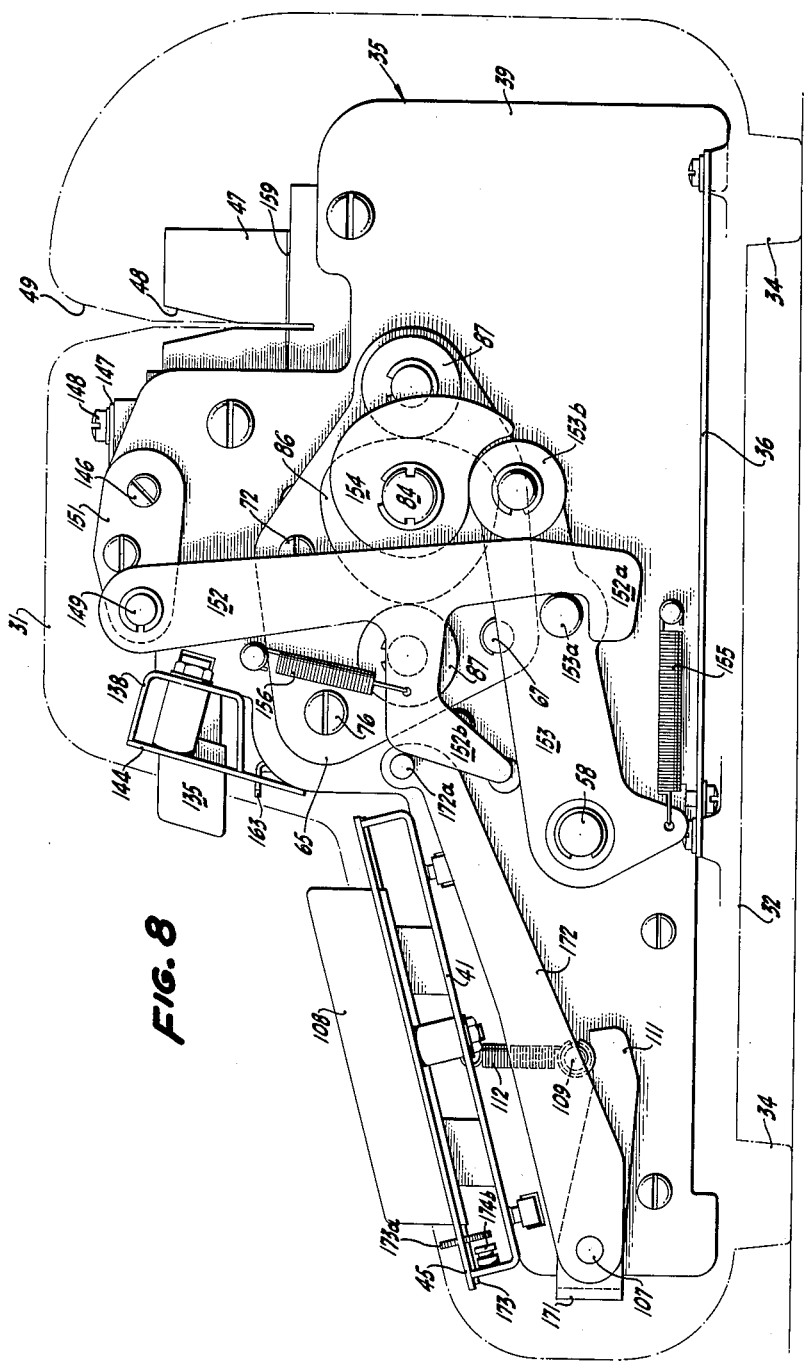

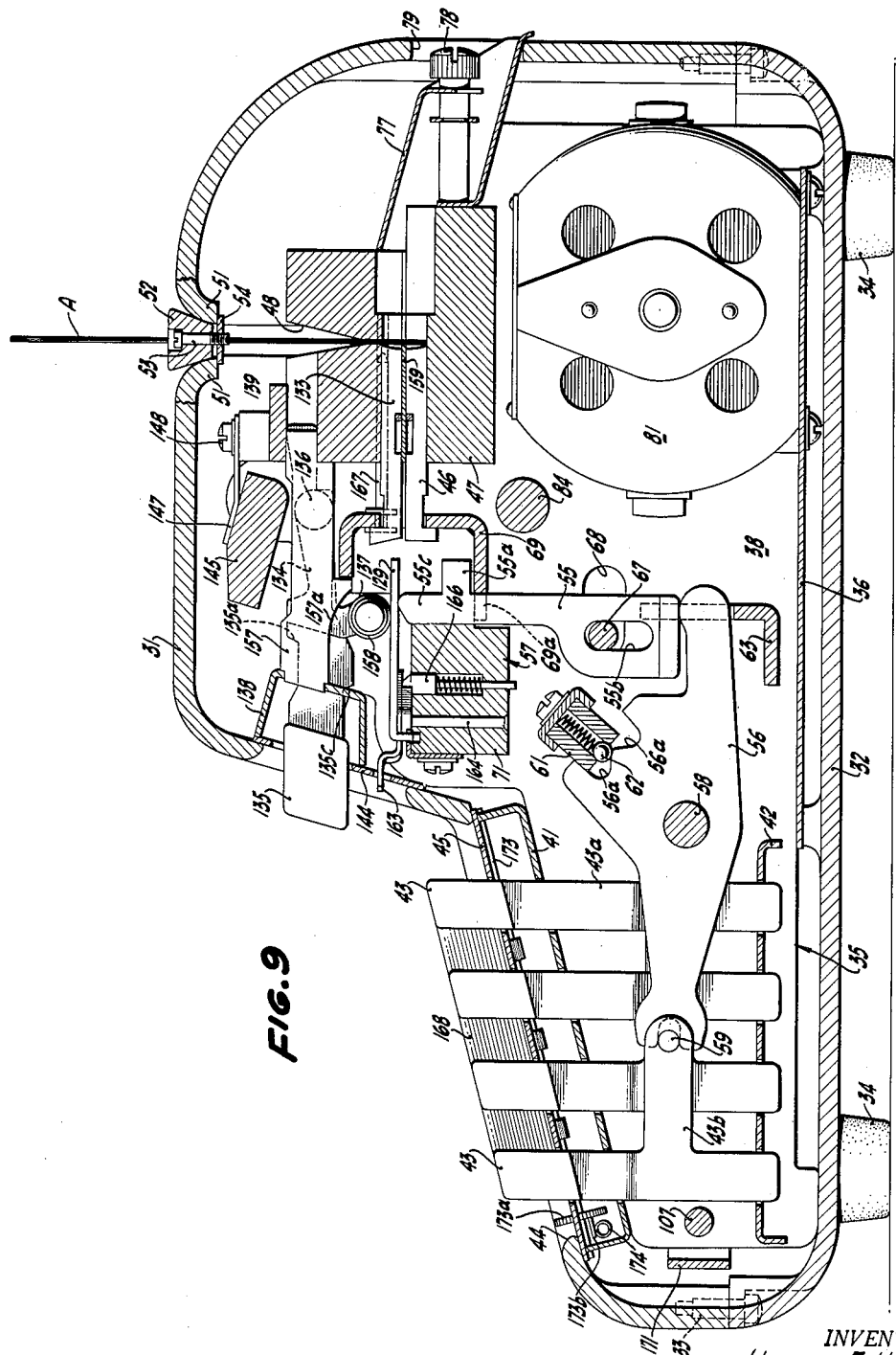

Feb. 21, 1956  H. E. HOOE  2,735,490
KEYSORT KEYPUNCH
Filed Sept. 25, 1951  11 Sheets-Sheet 6
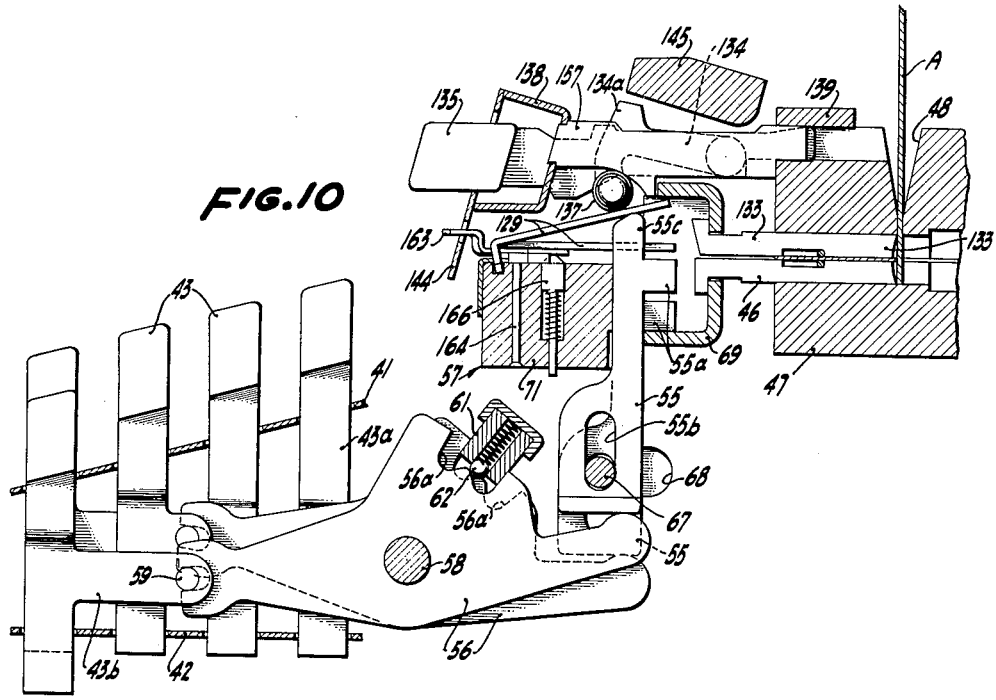
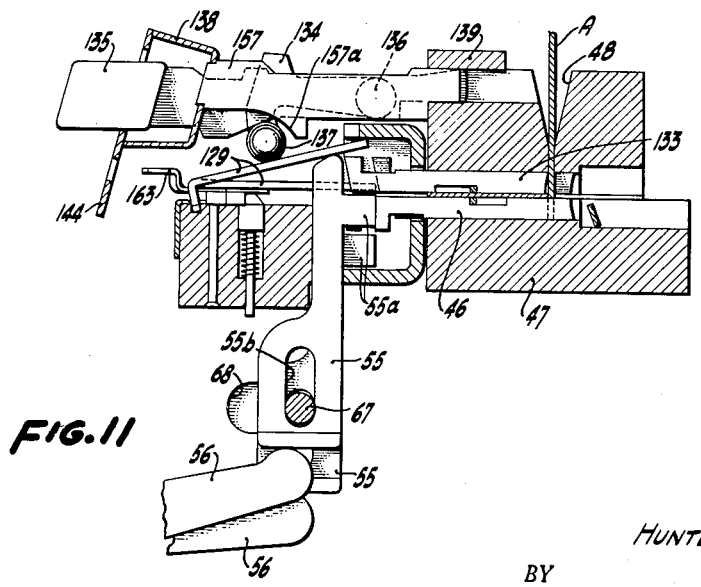
INVENTOR.
HUNTER E. HOOE
BY
Mellin and Hanson
ATTORNEYS

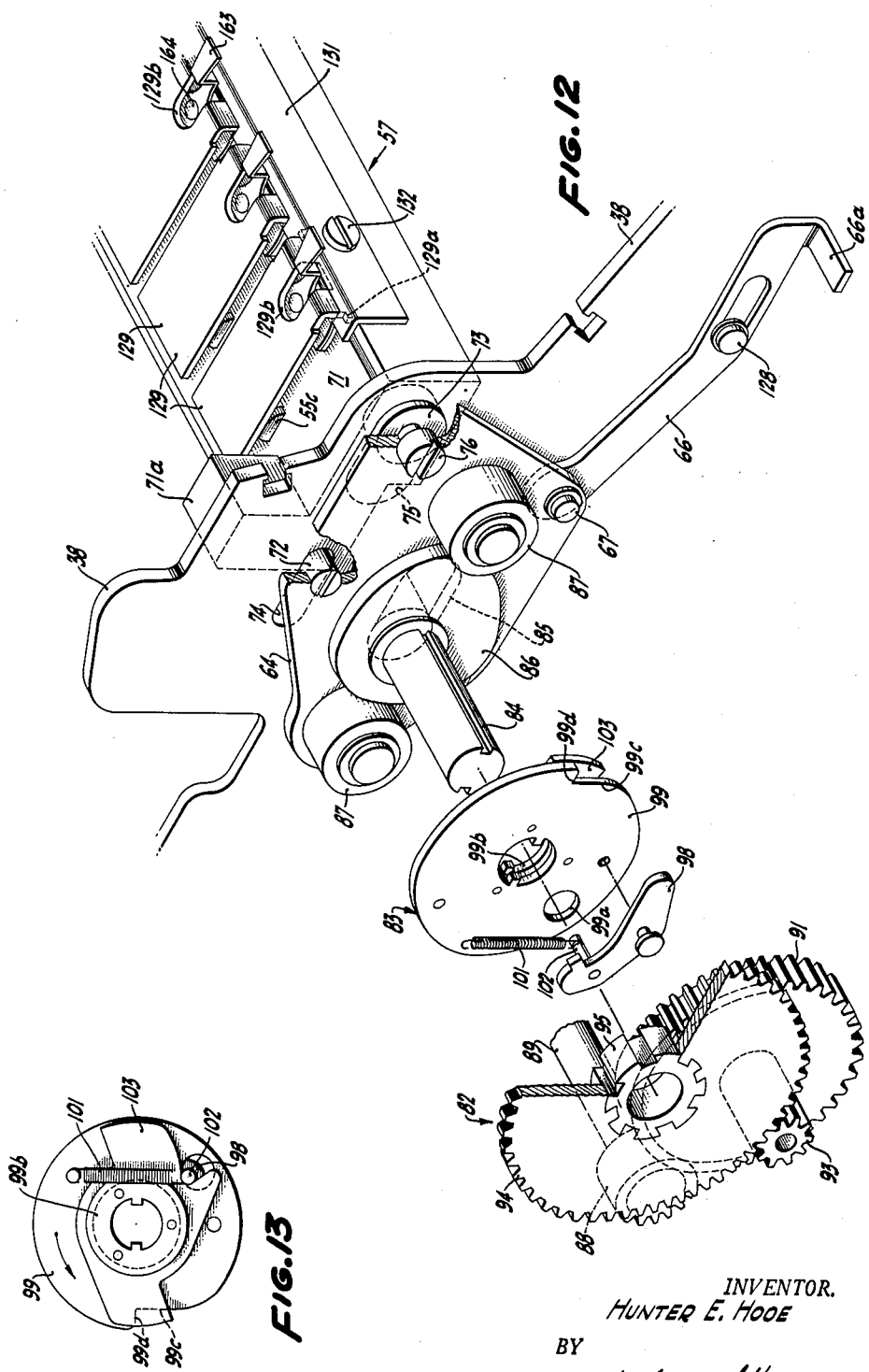

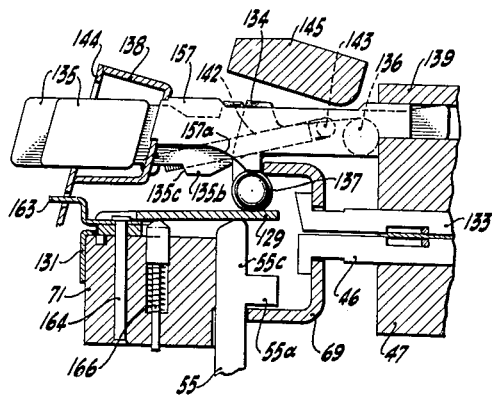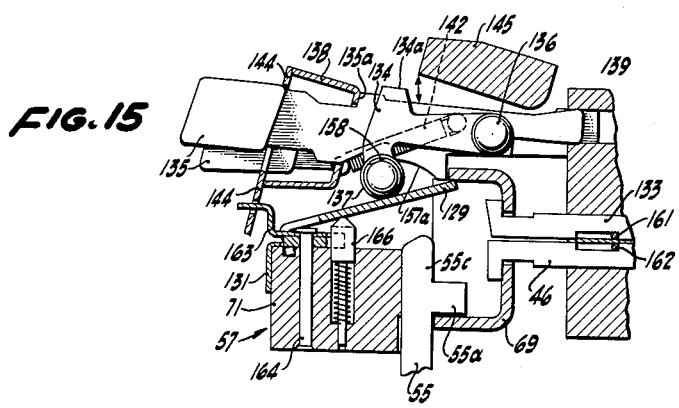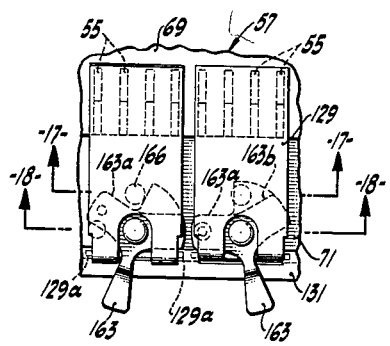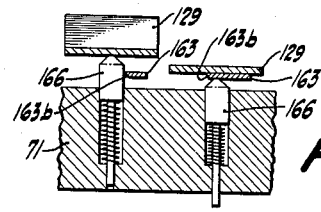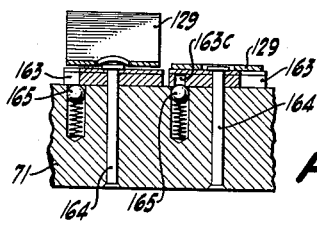
INVENTOR.
HUNTER E. HOOE

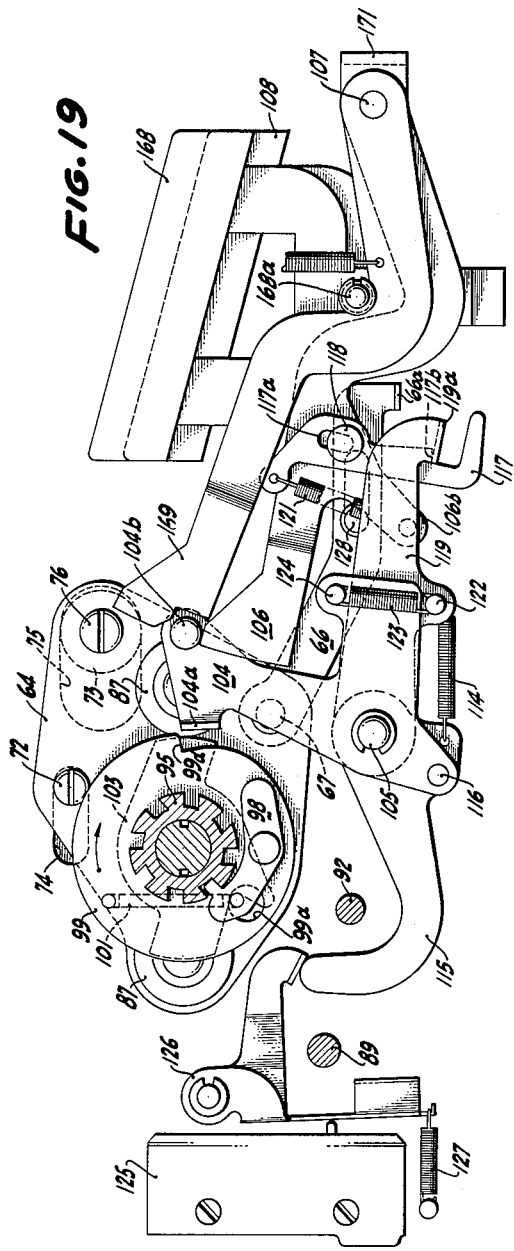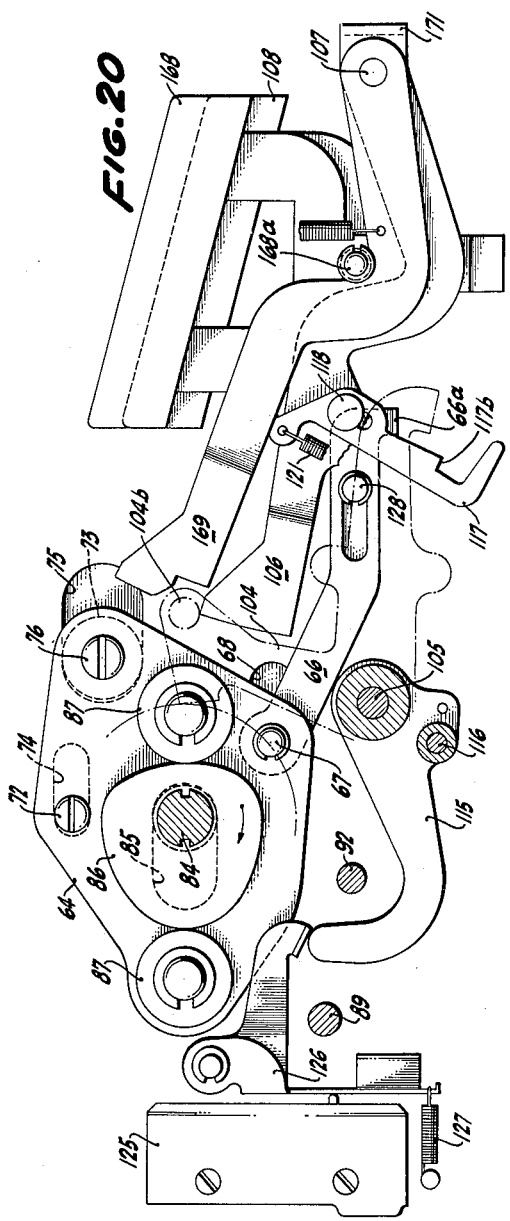

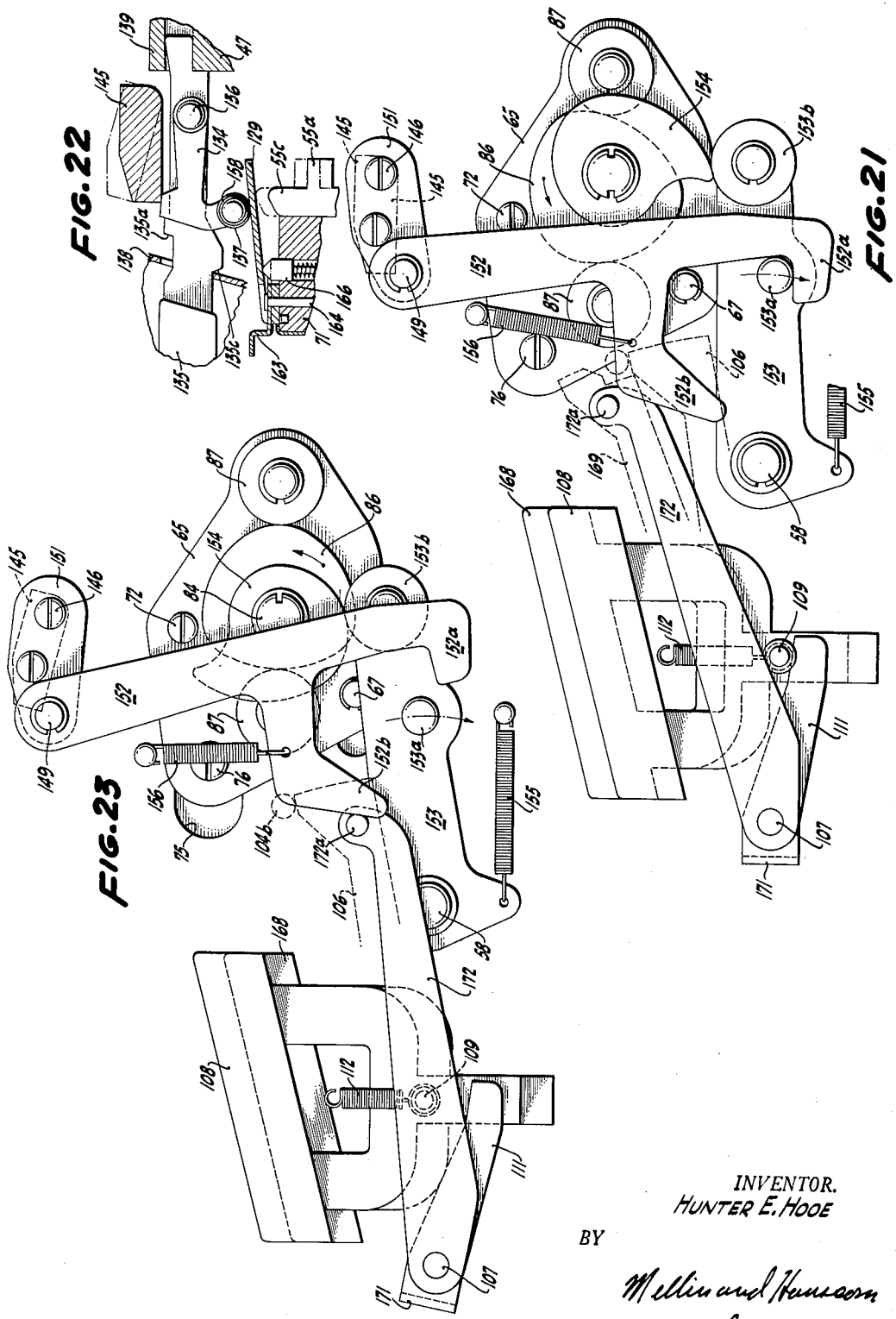

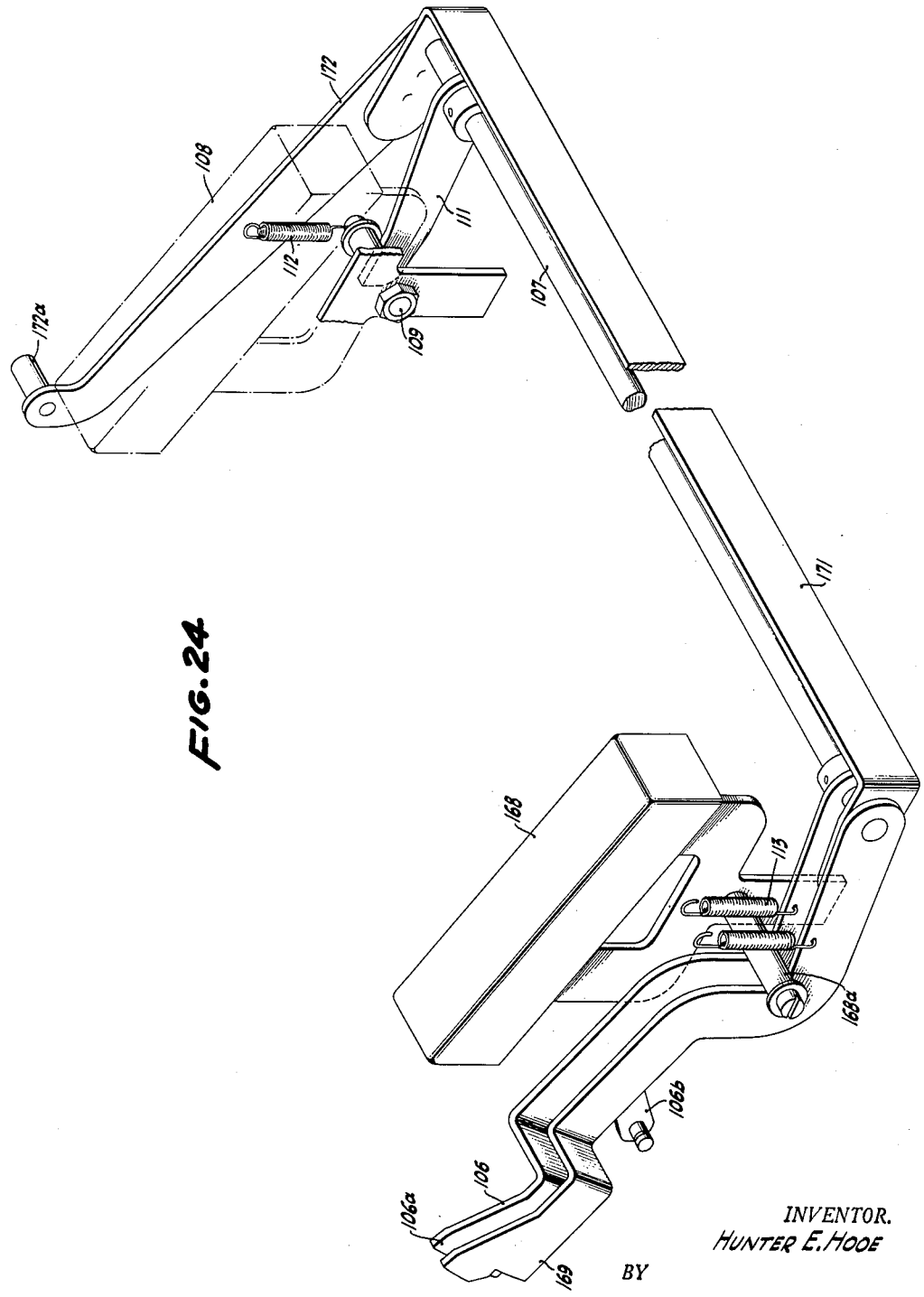

United States Patent Office 2,735,490
Patented Feb. 21, 1956

2,735,490

KEYSORT KEYPUNCH

Hunter E. Hooe, Athens, Ohio, assignor, by mesne assignments, to Royal McBee Corporation, a corporation of New York Application September 25, 1951, Serial No. 248,249

9 Claims. (Cl. 164—112)

This invention relates to a card or sheet punching machine, and particularly to a machine for selectively punching or coding classification cards.

A main object of the present invention is to provide a machine for selectively punching a classification card, which machine has a settable keyboard including a plurality of columns of keys adapted to be selectively set to determine the manner in which a first set of punches are to be punched, and which machine further includes a second set of punches and a mechanism for actuating the first set of punches in accordance with the pattern of the set keys and for actuating the second set of punches in accordance with the pattern of the unset columns of keys.

A more particular object of the present invention is to provide a machine as described in the immediately above paragraph in which the first set of punches are value punches and the second set of punches are cipher punches, whereby a machine is provided for automatically punching code areas of a card to indicate zero whenever the areas are not to be value punched, thereby eliminating the necessity for manually setting up for zero punching under these circumstances.

Another object of the present invention is to provide a machine of the type described in the second paragraph in which there are means operable for restoring all the keys of the keyboard to their unset positions to clear the keyboard after a cycle of operation of the punches.

A further object of the present invention is to provide a machine as described in the immediately above paragraph in which other mechanism is provided for inactivating the restoring means to condition the machine, when the restoring means is inactivated, for an identical repeat punching operation.

A still further object of the present invention is to provide a machine as described in the second paragraph in which there is a mechanism for selectively restoring the keys of the keyboard to their unset positions after a cycle of operation of the punches to condition the machine for a split or partial repeat of the previous punching operation; and to provide such a machine in which the latter named mechanism includes a repeat keyboard having a plurality of selectively operable keys movable to operative positions to condition the keys of the main keyboard for restorative movement and movable to inoperative position to condition the keys of the main keyboard for remaintenance in their set positions.

Another object of the present invention is to provide a machine as described in the second paragraph in which there are means selectively operable to inactivate the second set of punches to thereby allow blanking of certain areas of a classification card to enable the card to be coded or punched in the blank areas thereof at a subsequent time.

A further object of the present invention is to provide a machine as described in the second paragraph in which there are means for independently restoring the keys to unset position for correcting a mistake in the setting of the keys prior to a punching operation.

A still further object of the present invention is to provide a machine for selectively punching or coding classification cards in which there is a movable aligning device operable in precedence to the operation of the punches for aligning a card in a predetermined position relative to the punches.

Another particular object of the present invention is to provide a machine for selectively punching or coding classification cards in which there is an adjustable gauge against which the cards can be manually positioned to achieve an initial alignment of a card with the punches.

Various other objects of the present invention will be apparent from the following description taken in connection with the accompanying drawings, in which:

Fig. 6 is a top plan view of the machine disclosed in Fig. 1 with the top cover removed and the parts partly broken away for convenience in illustration.

Fig. 7 is a lefthand end view of the machine disclosed in Fig. 1 showing the outline of the case in dot-dash lines.

Fig. 8 is a righthand end view of the machine disclosed in Fig. 1 and showing the outline of the case in dot-dash lines.

Fig. 9 is a vertical longitudinal sectional view taken along line 9—9 of Fig. 6, showing the machine in position prior to setting of any of the keys on the main keyboard and prior to actuation of the punches.

Fig. 10 is a fragmentary view, similar to Fig. 9, showing the position of the parts after one of the main keyboard keys has been depressed.

Fig. 11 is a fragmentary view, similar to Fig. 10, showing the position of the parts during the punching stroke of the reciprocating carriage.

Fig. 12 is an isometric view, partially exploded, showing the drive for the reciprocating carriage of the machine.

Fig. 13 is a side view of a one-cycle clutch incorporated in the drive to the reciprocating carriage.

Fig. 14 is a fragmentary view of a part of Fig. 9 showing the nearest column repeat key shoved inwardly to a position for returning the associated main keyboard keys to unset positions for correcting a mistake in setting the keys prior to a punching operation.

Fig. 15 is a view similar to Fig. 14 but showing the nearest column repeat key in its forwardmost position to inactivate the column of keys associated with the nearest column repeat key for restorative movement.

Fig. 16 is a fragmentary top plan view of a portion of Fig. 6 showing two cipher punch control levers in different positions.

Fig. 17 is a vertical cross-sectional view taken along line 17—17 of Fig. 16 showing two cipher punch actuating plate elevating plungers in different positions.

Fig. 18 is a vertical cross-sectional view taken along line 18—18 of Fig. 16 showing the manner of mounting the cipher punch control levers.

Fig. 19 is a fragmentary view similar to Fig. 7, but showing the parts in the positions they assume after the main motor control bar has been depressed and just prior to rotation of the main drive shaft.

Fig. 20 is a view similar to Fig. 19 with some of the parts being removed for purposes of clarity and showing the parts in the positions they assume after the main drive shaft has been rotated 180 degrees.

Fig. 21 is a fragmentary view of a portion of Fig. 8, but showing the parts in the positions which they assume after the main motor control bar has been depressed and when the cycle of operation is almost completed.

Fig. 22 is a fragmentary view of Fig. 15 showing the positions which the cipher punch actuating plates and punch actuators assume when the parts in Fig. 21 assume the positions shown in this figure.

Fig. 23 is a view similar to Fig. 21, but showing the parts in the positions they assume when the repeat motor control bar is depressed and the main drive shaft has been rotated 180 degrees.

Fig. 24 is an isometric view of the motor control bars and the control levers which they actuate.

Figure 1:
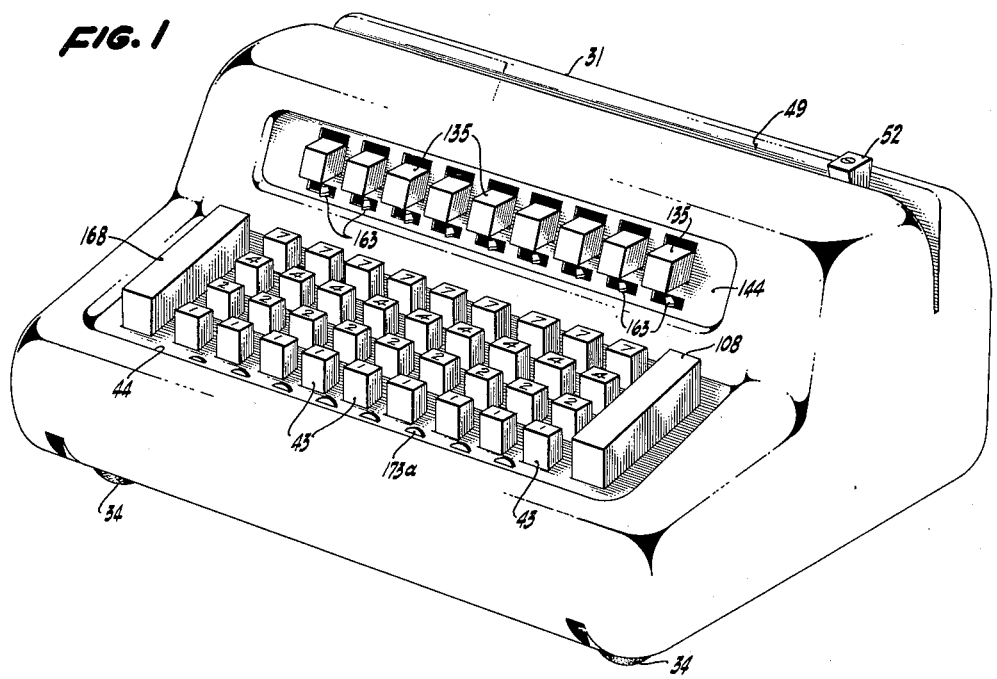
Fig. 1 is a perspective view of a machine embodying the concepts of the present invention.

The specific embodiment of the machine disclosed in the drawings is particularly adapted for punching a so-called P. M. Zenner card such as disclosed in Figs. 2, 3, 4 and 5, but the invention is not intended to be limited by reference to the punching of the Zenner card but only to illustrate a practical application of the present invention. Reference to the manner of punching the Zenner card will be made more in detail hereinafter but for the present it will suffice to say that along one or more edges of the card there is provided a plurality of areas to be coded, each area having four outer perforations associated with numerals 1, 2, 4 and 7 and an inner perforation normally disposed in alignment with and inwardly of the "1" perforation. When any number from 1 to 9 is desired in a particular area, the particular perforation or perforations are notched to the card edge from the outer row of perforations. By a suitable combination of notches, any number from 1 to 9 can be obtained in an area. When an area is to indicate a zero classification, the card is slotted from the "1" perforation to the "0" perforation, such as shown at 176 in Fig. 3.

Now, referring to the accompanying drawings wherein similar reference characters designate similar parts throughout, the machine disclosed and embodying the concepts of the present invention includes an operating mechanism enclosed by a casing consisting of a cover 31 and a base 32 connected together by screws 33, said base being supported by suitable feet or pads 34. Supporting the operating mechanism within the case is a frame generally entitled 35 including a bottom mounting plate 36 secured to base 32 by screws 37, and spaced upright side members 38 and 39, secured to the mounting plate at their lower ends (compare Figs. 6 and 7).

Connected to and supported by side members 38 and 39 are a pair of spaced guide plates 41 and 42. Guide plates 41 and 42 have groups of vertically aligned slots formed therein receiving and guiding the stems 43a of a plurality of columns of vertically movable numerical value keys 43 (see Fig. 9). Keys 43 form a keyboard exposed by an opening 44 formed in the forward portion of top cover 31 (see Fig. 9), there being a suitable reticulated face plate 45 secured to side frame members 38 and 39 and surrounding the heads of keys 43 and also two motor control bars to be described hereinafter.

Operatively associated with keys 43 are a set of numerical value punches 46 equal in number to the number of keys and arranged horizontally, parallel and adjacent to one another and guided for horizontal movement by a die block 47 suitably recessed therethrough to slidably receive the punches. Die block 47 is secured at its ends to side frame members 38 and 39 and has a longitudinally extending V-groove 48 terminating at its lower end in a straight card positioning portion adapted to receive and position a card A. The top cover 31 is formed with slot 49 registering with V-groove 48 and extending transversely of the machine, as clearly shown in Fig. 1, and defined by in-turned lips 51 (see Fig. 9). An adjustable card positioning gauge 52 is seated within lips 51 and adjustably held in place by a screw 53 threadedly received by a nut 54 engaging the lower ends of lips 51. A classification card is inserted into slot 49 in the casing cover 31 and into V-groove 48 and seated against the die block 47 in a position against adjustable gauge 52 to initially position the card with reference to punches 46 and another set of punches to be described hereinafter.

Numerical value keys 43 and numerical value punches 46 are associated or paired off in the following manner: Proceeding from left to right of the punches, the keys are associated therewith beginning with the extreme lefthand column of keys, as the parts are shown in Fig. 6, and proceeding to the extreme righthand column of keys, and proceeding from the top key of each column to the bottom key of each column.

Referring to Figs. 6 and 9, numerical value keys 43 are adapted, when depressed or set, to elevate a plurality of vertically movable punch actuators 55, through the medium of a plurality of key levers 56, from lower inoperative positions to upper operative positions to register rearwardly extending noses 55a on the punch actuators with the forward portions of punches 46. Throughout the following description, when reference is made to the forward portion of a part, this has reference with respect to the front of the machine, and, when reference is made to the rear or rearward portion of a part, this has reference to the back or rear part of the machine. For the sake of clarity, this plan will be adhered to even with regard to the punches which have their operative cutting edges facing toward the back of the machine and, therefore, these operative edges will be referred to as the rearward portions of the punches, and the opposite ends of the punches will be referred to as the forward portions of the punches.

Punch actuators 55 are carried by a reciprocating carriage, generally entitled 57, rearwardly toward the punches, the operatively disposed punch actuators engaging their punches to drive the same through a classification card supported by die block 47. Carriage 57 will be described in detail hereinafter. As is apparent from Fig. 9, the punch engaging noses 55a of the punch actuators 55 are normally spaced below and forwardly of the forward ends of punches 46 and, therefore, the punch actuators which are not elevated will merely move beneath the forward ends of the punches and, therefore, not actuate the punches.

Key levers 56 are equally spaced from and parallel to one another and are pivotally mounted intermediate their ends on a pivot shaft 58 secured at its ends to side frame members 38 and 39. Since key levers 56 are laterally spaced from one another and since numerical value keys 43 are arranged in longitudinally extending columns, the depending stems 43a of numerical value keys 43 are laterally bent to the right or left depending on the location of each key relative to its key lever, and have forward or rearward extensions 43b, again depending on the location of each key relative to its key lever, on the ends of which extensions are provided headed pins 59 laterally aligned with one another and receivable in bifurcated forward ends formed on key levers 56. The forward ends of key levers 56 are, therefore, guided by the co-action of extensions 43b and the heads of pins 59.

Numerical value keys 43 are limited in their vertical movement by a detent bar 61 secured at its ends to side frame members 38 and 39, said detent bar being receivable within W-shaped notches 56a formed in key levers 56. Numerical value keys 43 are urged to occupy one or the other of their extreme positions, i. e., either their normal elevated positions or their depressed set positions, by a plurality of spring-pressed ball detents 62 mounted in detent bar 61 and disposed in registry with key levers 56 and engaging the humped portions of the key levers formed by the particular notch formation to have an over-center action therewith.

At their lower ends, punch actuators 55 rest on the rearward ends of key levers 56, said lower ends of said punch actuators having sufficient depth to remain in engagement with their key levers throughout the forward and rearward movement of the punch actuators relative to the key levers (compare Figs. 9 and 11). The rearward ends of key levers 56 and the lower ends of punch actuators 55 are guided by a comb 63 secured at its ends to side frame members 38 and 39.

Traveling carriage assembly

Traveling carriage 57 includes two end plates 64 and 65 (see Figs. 7, 8 and 12), disposed adjacent the outer faces respectively of side frame members 38 and 39 and slightly spaced from the side members by washers (not shown), fitting on a main drive shaft to be described, to provide a clearance space for a trip arm 66 to be referred to hereinafter which is disposed between end plate 64 and the outer face of side frame member 38 (see Fig. 12). End plates 64 and 65 are connected by various elements, to be explained, but of immediate importance by a guide rod 67 secured at its ends to end plates 64 and 65 and extending through clearance slots 68 formed in side frame members 38 and 39 and through vertically disposed oblong guide slots 55b formed in punch actuators 55 to assist in guiding the actuators for vertical movement (see Fig. 9).

Punch actuators 55 are also guided for vertical movement by a comb 69a formed on a U-shaped punch retractor 69. Retractor 69 is slotted longitudinally to receive the forward ends of numerical value punches 46 which have depending portions formed thereon engaging the retractor 69 and enabling the retractor to retract the punches after a punching operation, said retractor being carried by carriage 57.

Punch actuator 55 are moved rearwardly by a punch bar 71 disposed in constant engagement with the forward edges of the punch actuators (compare Figs. 9 and 11) by retractor 69 which is secured to the punch bar in a manner to be presently explained. Punch bar 71 has its ends slidably disposed against the inner faces of side frame members 38 and 39, and guided for reciprocating movement relative to said side frame members by a pair of rearwardly disposed laterally extending stub shafts 72 and a pair of forwardly disposed laterally extending guide rollers 73 received respectively by horizontally disposed oblong guide slots 74 and 75 formed in side frame members 38 and 39 (compare Figs. 12 and 23). Stub shafts 72 are received by apertures in end plates 64 and 65, and rollers 73 are mounted on shoulder screws 76 which extend through apertures formed in end plates 64 and 65 of carriage 57 and are threadedly received by punch bar 71. It follows, from the above description, that punch bar 71 is connected to and movable in unison with end plates 64 and 65.

Punch retractor 69 is secured to punch bar 71 by screws (not shown) extending through the upper leg of punch retractor 69 and threadedly received by rearwardly extending block-shaped portions 71a formed on punch bar 71 and fitting within retractor 69 (compare Figs. 9 and 12).

The explanation to this point shows that the punch actuators 55 can be selectively elevated by selectively depressing numerical value keys 43 so that when carriage 57 is moved rearwardly the operatively disposed punch actuators are carried into engagement with their associated numerical value punches to drive the punches through a card disposed in die block 47; and so that when carriage 57 is moved forwardly the punch retractor 69 will be effective to retract the actuated punches to their inoperative positions, the positions shown in Fig. 9.

As is obvious from Fig. 11, retractor 69 moves relative to numerical value punches 46 from the position shown in Fig. 10 to the position shown in Fig. 11 until the punch actuators move into engagement with the rearward ends of numerical value punches 46.

Further instrumentalities mounted on, affected by or operated in conjunction with the traveling carriage 57 will be explained hereinafter; it will suffice to say at this time that these instrumentalities concern the functioning and operation of a set of cipher punches, and a mechanism for effecting the restoration of numerical value keys to their elevated positions.

As is apparent from Fig. 9, there is a paper chip chute 77 disposed rearwardly of die block 47 and removably mounted on the die block by a shoulder screw 78. Chute 77 extends through an opening 79 formed in the rear of case cover 31 and serves to convey paper chips from die block 47 through the rear of the machine. When it is desired to remove case cover 31 the paper chip chute 77 can be removed by removal of shoulder screw 78.

Carriage drive mechanism

Carriage 57 is adapted to be reciprocated upon depression of an appropriate motor control bar by an intermittently operated motor 81 mounted on mounting plate 36 (see Fig. 9). The drive from motor 81 to carriage 57 will be first explained, and then the arrangement for energizing motor 81 upon depression of one of the two motor control bars will follow.

Motor 81 is adapted to reciprocate carriage 57 through a speed reduction gear train generally entitled 82, driving one side of a one-revolution clutch generally entitled 83 mounted on a main drive shaft 84, which rotatably extends through side frame members 38 and 39, and extends through clearance slots 85 formed in carriage end plates 64 and 65. Main drive shaft 84 has fixedly mounted thereon adjacent its opposite ends a pair of constant-diameter eccentrically mounted cams 86, each of which engages a pair of diametrically opposed rollers 87 mounted on carriage end plates 64 and 65 (compare Figs. 7 and 8). When one-revolution clutch 83 is engaged, in a manner to be explained, it is apparent that carriage 57 will be actuated through one complete cycle of operation by the constant-diameter cams 86, therefore moving the operatively positioned punch actuators 55 into engagement with their associated numerical value punches 46, driving the punches through the card A and retracting the punches through the medium of punch retractor 69.

Speed reduction gear train 82 includes a pinion 88 mounted on the motor shaft 89, a large intermediate gear 91 driven by pinion 88 and mounted on a relatively short shaft 92, which shaft also carries a small gear 93 fixed to and driven by large gear 91 and engaging and driving a large gear 94, fixedly mounted on a ratchet 95 which is rotatably mounted on main drive shaft 84 and constitutes a part of one-revolution clutch 83. Short shaft 92 is mounted at its ends in side frame member 38 and a standard 96 secured to mounting plate 36 by nuts and bolts 97 (see Fig. 7). The end of main drive shaft 84 protruding beyond side frame member 38 is also rotatably mounted in standard 96 (see Fig. 7).

One-revolution clutch 83 includes ratchet 95, previously referred to, a pawl 98 intermittently engageable with the ratchet 95 and pivotally mounted on a limit disc 99 keyed to main drive shaft 84, the purpose of which limit disc will be presently explained. There is a tension spring 101 connecting pawl 98 to limit disc 99, said spring being connected to a pin 102 extending from pawl 98 through a clearance opening 99a formed in limit disc 99 (see Figs. 12 and 13). A rockable pawl cam 103 is rotatably mounted on a hub 99b fixed to limit disc 99 and keyed to main drive shaft 84 and is rockable, from the position shown in Fig. 12, where the pawl is allowed to engage ratchet 95, counterclockwise, by an element to be explained, to rock or tilt pawl 98 out of engagement with ratchet 95, this disengaged position of pawl 98 and ratchet 95 not being specifically shown in the drawings but being readily apparent by a comparison of Figs. 7, 12 and 13.

Referring particularly to Figs. 7, 19 and 20, a mechanism is provided for properly operating clutch 83, such mechanism including a clutch control link 104 pivotally mounted on a shaft 105 and having an out-turned ear 104a engageable with pawl cam 103, as shown in the position the parts assume in Fig. 7, when said clutch control link 104 is rocked from the position shown in Fig. 19 to the position shown in Fig. 7, said ear entering a recess or notch 99c formed on limit disc 99 and engaging a shoulder 99d defining the end of the notch. In the position of the parts in Fig. 7, clutch control link 104 is latched in the position shown by a control lever 106 in a manner to be presently described so that further movement of the carriage 57 is positively prevented. The arrangement is such that ear 104a causes pawl 98 to be disengaged just prior to the engagement of ear 104a on clutch control lever 104 with shoulder 99d on limit disc 99.

Control lever 106, previously referred to, is secured at its forward end to a rock shaft 107 pivotally mounted in side frame members 38 and 39 (compare Figs. 7, 8, 9 and 24). Rock shaft 107 is pivotally actuated by a main motor control bar 108, the stem of which is slidably mounted for vertical movement in guide plates 41 and 42 (in a manner similar to the mounting of the stems 43a of numerical value keys 43 but not specifically shown), said stem carrying a laterally protruding pin 109 engaging a lever 111 secured at its forward end to the opposite end of rock shaft 107. Main motor control bar 108 is spring urged upwardly by a tension spring 112 connected at its ends to pin 109 and to upper guide plate 41 (see Fig. 8). Control lever 106 is also urged upwardly by a tension spring 113 (see Fig. 24) which connects control lever 106 with upper guide plate 41. Tension spring 112 for main motor control bar 108 serves to return the main motor control bar to its elevated position after depression thereof and tension spring 113 for control lever 106 likewise urges the control lever to return to its elevated position, but which latter movement is intermittently prohibited, in a manner to be presently described.

Main motor control bar 108 has been so entitled merely for the purpose of differentiating it from a repeat motor control bar, to be described hereinafter, both motor control bars being of approximately equal importance.

The rearward nose 106a of control lever 106 is disposed to prevent clockwise movement of clutch control link 104 when the parts are disposed in the positions shown in Fig. 7, which is the normal inoperative position of the machine, said nose being in engagement with or closely disposed with respect to a laterally extending pin 104b fixed to the upper end of clutch control link 104. It follows, therefore, from the above description that upon a depression of main motor control bar 108, control lever 106 is pivoted counter-clockwise, as the parts are depicted in Fig. 7, to the position shown in Fig. 19 to clear the nose 106a of control lever 106 with respect to pin 104b on clutch control link 104, therefore allowing clockwise movement of clutch control link 104 to enable engagement of the clutch, such clockwise movement of clutch control link 104 being caused by means to be presently explained.

Clutch control link 104 is urged in a counter-clockwise direction, as the parts are depicted in Fig. 7, by a tension spring 114 connected at one end to side frame member 38 and at its opposite end to a rearward clutch control link extension 115 rotatably mounted at its forward end on shaft 105 and pinned to the lower end of clutch control link 104 at 116 to be movable with the clutch control link, said rearward extension 115 being disposed behind large gear 91, as shown in Fig. 7 by the dotted line, this construction being for the purpose of compactness.

When main motor control bar 108 is depressed, clutch control link 104 is caused to pivot in a clockwise direction, to free clutch 83 for engagement, by a trip link 117 carried by control lever 106 on a headed pin 118 fixed to the control lever and extending through an oblong slot 117a formed in the trip link. Trip link 117 is urged into constant engagement with a forwardly disposed in-turned ear 119a, formed on a forward extension 119 of clutch control link 104, by a tension spring 121 connected to the trip link at one end and connected at its opposite end to a depending portion 106b formed on control lever 106 (compare Figs. 7 and 19).

Forward clutch control link extension 119 is pivoted at its rear end on shaft 105, and urged to move with clutch control link 104 by a fixed pin 122 on forward extension 119 extending under the lower edge of clutch control link 104 and urged into engagement with the clutch control link by a tension spring 123 connecting pin 122 with a fixed pin 124 on the clutch control link.

Trip link 117 has a shoulder 117b formed thereon and engageable with ear 119a on clutch control link extension 119 when the trip link is carried downwardly by control lever 106 to therefore pivot clutch control link extension 119 downwardly. Pin 104b prevents movement of control link 104 because of its engagement with nose 106a of control lever 106. Forward extension 119 therefore pivots slightly relative to control link 104 until nose 106a clears pin 104b at which time the pin snaps over nose 106a under the influence of spring 123 to latch the link 104 and control lever 106 in the position shown in Fig. 19. To explain further, it is the co-action of pin 104b on clutch control link 104 with the top of the nose 106a of control lever 106, and shoulder 117b on trip link 117 with the in-turned ear 119a on clutch lever control link forward extension 119 which effects such latching operation.

In this latched position, the forward ear 104a of clutch control link 104 is disposed clear of shoulder 99d of limit disc 99 so as to free pawl cam 103 which pivots from the position shown in Fig. 7 to the position shown in Fig. 19 to free pawl 98 for engagement with ratchet 95 and allow rotation in a clockwise direction, as the parts are depicted in Fig. 7, of the limit disc and therefore allow rotation of the main drive shaft. Trip link 117 is adapted to be tripped in a manner to be presently explained to again dispose ear 104a on clutch control link 104 in position for engagement with pawl cam 103 and shoulder 99d on limit disc 99 when the disc completes one revolution.

It follows from the above description that when main motor control bar 108 is depressed, clutch control link 104 will be pivoted slightly in a clockwise direction after nose 106a on control lever 106 clears pin 104b on clutch control link 104 to clear clutch 83 to allow engagement thereof, both clutch control link 104 and control lever 106 being latched in the positions shown in Fig. 19 by the co-action of the parts previously mentioned above.

Rearward extension 115 of clutch control link 104, being carried by the clutch control link as previously mentioned, is adapted to actuate a micro-switch 125 to energize motor 81. This action is effected by the provision of a pivoted bell crank 126, one end being disposed in engagement with the micro-switch button and the other end being urged into engagement with the rear end of rearward extension 115 of clutch control link 104 by a tension spring 127 connected at one end to bell crank 126 and at the opposite end to side frame member 38.

Referring to Figs. 19 and 20, it follows that when main motor control bar 108 is depressed, rearward extension 115 of clutch control link 104 will be pivoted clockwise from the position shown in Fig. 7 to the position shown in Fig. 19 to engage bell crank 126 and pivot the bell crank to release the micro-switch 125, therefore closing the micro-switch and energizing motor 81. When motor 81 is energized, carriage 57 will be moved rearwardly and then forwardly through gear train 82 operating constant-diameter cams 86.

To provide for a one-cycle movement of carriage 57, the carriage carries trip arm 66 (previously mentioned) connected at one end to carriage end plate 64 and guided by a headed pin 128 protruding from side frame member 38 (see Fig. 12). The forward end of trip arm 66 has a laterally extending ear 66a formed thereon disposed forwardly of trip link 117 as clearly shown in Fig. 7 and also Figs. 19 and 20. When carriage 57 is moved rearwardly, ear 66a on trip arm 66 engages trip link 117 when the carriage is near its rearwardmost point of movement, moving the trip link relative to fixed pivot pin 118 from the position shown in Fig. 19 to the position shown in Fig. 20 to trip the same and release clutch control link 104 on counterclockwise movement under the influence of tension spring 114. The movement of clutch control link 104 at this point in the cycle of operation is slight since the upper ear 104a thereof engages the arcuate peripheral portion of limit disc 99. This movement of clutch control link 104 is not sufficient to open micro-switch 125, so that motor 81 remains energized and carriage 57 continues to be driven by the motor.

However, when limit disc 99 has been rotated to an extent such as to bring notch 99c thereof into registry with ear 104a of clutch control link 104, clutch control link 104 under the influence of tension spring 114 moves progressively inwardly in accordance with the contour of the notch to first open micro-switch 125 through the operation of the rearward extension 115 of clutch control link 104 and simultaneously engage pawl cam 103 to rotate the cam from the position shown in Fig. 19 counterclockwise to cam pawl 98 out of engagement with ratchet 95. Also, such movement of clutch control link 104 releases control lever 106 for upward movement under the influence of tension spring 113 to dispose nose 106a of said clutch control lever 106 forwardly of pin 104b on clutch control link 104 to prevent subsequent clockwise movement of clutch control link 104 until the control lever is again depressed. Ear 104a of clutch control link 104 then engages shoulder 99d on limit disc 99 and, being prevented from clockwise movement by nose 106a of control lever 106, prevents further rotation of limit disc 99 and therefore further movement of carriage 57. Motor 81 being previously de-energized coasts to a stop.

*Automatic key elevating mechanism*

A suitable mechanism is provided and is operable near the end of a cycle of operation, set in motion by a depression of main motor control bar 108, to automatically elevate all the keys which have been depressed and set for the cycle of operation, and to thereby clear the keyboard for the next cycle of operation.

Referring to Fig. 6, the above mentioned mechanism includes a plurality of cipher punch actuating plates 129, there being one for each column of keys, which plates are carried by carriage 57 by being pivotally mounted at their forward downwardly extending ends by a longitudinally slotted retainer plate 131 fastened to punch bar 71 by screws 132 (see Fig. 12). Retainer plate 131 covers laterally extending lugs 129a formed on plates 129 (compare Figs. 14 and 16).

Plates 129 overlie the upwardly extending noses 55c of punch actuators 55, each plate 129 overlying a bank of punch actuators corresponding to and associated with one column of numerical value keys 43. Plates 129 are elevated to inclined positions by the actuators when the actuators are elevated and operate when depressed to depress the actuators and thereby elevate numerical value keys 43 through the medium of key levers 56 to restore the keys to their normal elevated unset positions.

Plates 129 are also operable to drive a plurality of cipher punches 133 through card A, when they are not tilted, but this structure will be explained hereinafter.

Disposed above and in registry with plates 129 are an equal number of numerical value key restoring arms 134 pivotally carried by horizontally movable column repeat keys 135 on pivots 136, each arm having a roller 137 adapted to ride on the upper face of the associated plate. When restoring arms 134 are depressed, rollers 137 operate to depress plates 129 to cause a restorative action of numerical value keys 43. Further reference to restoring arms 134 will be presently made, but of immediate importance is the construction of column repeat keys 135.

Column repeat keys 135 are slidably supported for horizontal movement by having their forward ends slidably receivable through slots provided in a U-shaped guide plate 138 secured at its ends to side frame members 38 and 39, and by having their rearward ends slidably receivable through aligned slots formed in die block 47. The latter slots are preferably formed by transversely notching die block 47 and covering the notches with a cover plate 139 secured to the die block by screws 141 (see Fig. 6). Column repeat keys 135 are urged forwardly and downwardly by tension springs 142 connected at one set of ends to the column repeat keys by pins 143 and connected at their other ends at a lower level to the U-shaped guide member 138 (see particularly Fig. 15). Stop shoulders 135a are formed on the upper edges of column repeat keys 135 and serve to limit forward movement of the column repeat keys as shown in the case of the nearest column repeat key in Fig. 15. There is a reticulated face plate 144 secured to U-shaped guide member 138, said reticulated face plate having an upper row of openings to accommodate the heads of column repeat keys 135, as is apparent from a comparison of Figs. 1, 14 and 15. When column repeat keys 135 are moved to their outer or forwardmost positions, as shown in the case of the nearest column repeat key in Fig. 15, the repeat keys rest on depending protuberances 135b defined at their forward faces by stop shoulders 135c, as clearly shown in Fig. 14.

Column repeat keys 135 are shiftable from their outer slightly upwardly inclined positions (compare the keys of Fig. 15) inwardly or rearwardly and somewhat downwardly to intermediate positions, as shown in the case of the repeat key disclosed in Figs. 10 and 22, and held in such intermediate position by shoulders 135c disposed in engagement with U-shaped guide plate 138.

In these intermediate positions, column repeat keys 135 are adapted to dispose upwardly protruding portions 134a formed on restoring arms 134 under a key restorer bar 145, which when depressed depresses the rearwardly disposed restoring arms 134, pivoting them downwardly relative to their respective column repeat keys 135. Rollers 137 on arms 134 depress plates 129, and through the medium of punch actuators 55 and key levers 56 restore numerical value keys 43 to their normal elevated unset positions.

Key restorer bar 145 is mounted for pivotal movement about its rear edge by laterally extending studs 146 pivotally received by side frame members 38 and 39 (compare Figs. 6 and 8). A leaf spring 147 fastened to die block cover plate 139 by screws 148 (see Fig. 9) limits upward tilting movement of restorer bar 145.

Referring particularly to Figs. 6, 8 and 21, restorer bar 145 is pivotally connected by a pivot 149, secured to an end plate 151 fixed to the righthand end of restorer bar 145 as the parts are depicted in Fig. 6, to the upper end of a restorer bar actuator 152 having a bottom hook 152a formed thereon engageable with a laterally extending pin 153a carried by a restorer lever 153 which is pivotally mounted at its forward end to side frame member 39 (see particularly Fig. 8). Restorer lever 153 is actuated by a cam 154 fixed to the end of the main shaft 84 which protrudes through side frame member 39, said cam engaging a follower roller 153b mounted on the rear end of restorer lever 153. Cam 154 rotates in a counterclockwise direction as the parts are depicted in Fig. 8. A tension spring 155 connects the restorer lever and side frame member 39 and urges roller 153b into engagement with the cam 154. The parts in Fig. 8 are disclosed in the positions they assume when the machine is at rest, and in this position it can be seen that roller 153b rests on the portion of the cam 154 radially closest the axis of rotation of main shaft 84. It is further evident from Fig. 8 that under these conditions pin 153a on restorer lever 153 is disposed against the restorer bar actuator 152 and disposed slightly above the hook 152a formed thereon. Such clearance between pin 153a and hook 152a enables the restorer bar actuator 152 to be moved toward and away from pin 163a when the machine is at rest for purposes to be described hereinafter.

It is also apparent from Fig. 8 that restorer bar actuator 152 is urged in a clockwise direction by a tension spring 156 connecting the restorer bar actuator to side frame member 39. The main operative protruding portion of cam 154 is so arranged that just prior to the end of the retreating or forward movement of carriage 57, it engages follower roller 153b and pivots restorer lever 153 downwardly to depress the restorer bar 145 through the medium of pin 153a and restorer bar actuator 152 (compare Figs. 8 and 21).

It follows from the immediately foregoing description that at the end of each cycle of operation initiated by main motor control bar 108 the numerical value keys which are set will be elevated and restored to their elevated normal positions, providing their column repeat keys 135 are disposed in their intermediate positions so as to dispose the upwardly protruding portions 134a of the associated restorer arms 134 under restorer bar 145.

It is frequently desirable to be able to repeat a particular pattern of set numerical value keys in certain columns and, therefore, in order to reduce the time and labor in operating the machine an arrangement is provided for permitting this repetitive action with certain selected columns. To accomplish this, the selected column repeat keys are slightly lifted to clear their depending shoulders 135c of the guide plate 138 and, therefore, release the keys for forward movement under the influence of tension springs 142 until the upward protruding shoulders 135a of column repeat keys 135 engage guide plate 138, such action carrying restoring arms 134 forwardly and disposing their upwardly protruding portions 134a out from under the restoring bar 145 so as to inactivate the selected columns against the restorative action of the restoring bar. Therefore, the depressed numerical value key or keys of the associated columns of numerical value keys remain in their depressed set positions for the next cycle of operation, and the unselected columns of keys, being elevated and unset, may be selectively reset as desired.

*Manual corrective reset arrangement*

In case a numerical value key or keys are mistakenly depressed, they can be restored or elevated to their normal unset positions prior to the depression of main motor control bar 108 by the following arrangement. Fixedly mounted by their opposite ends in aligned slots provided by U-shaped guide plate 138 and die block 47 (see Fig. 14) are a plurality of key restoring cams 157, equal in number to the number of column repeat keys and arranged between the column repeat keys as shown in Fig. 6. These cams have rearwardly and downwardly curving cam surfaces 157a engageable with rollers 158 carried by restoring arms 134 coaxially with previously described rollers 137. Rollers 158 are slightly smaller than rollers 137 so that rollers 158 clear plates 129 and are allowed free rolling movement against the cam surfaces 157a of key restoring cams 157.

Since each plate 129 controls the restorative action of a column of numerical value keys 43, one or more keys in a particular column can simultaneously be elevated and restored to unset positions by shifting the appropriate column repeat key 135 inwardly or rearwardly to a point past its intermediate position to a rearward position to bring the associated roller 158 into engagement with the cam surface 157a of the associated restorer cam 157, such as shown in the case of the nearest column repeat key 135, restorer arm 134, roller 158 and roller 137, as shown in Fig. 14, roller 158 and restorer arm 134 being driven downwardly and driving downwardly the associated plate 129, and through the medium of the associated bank of key actuators 55 and associated bank of key levers 56 restoring the associated column of keys 43 to their elevated positions.

*Cipher punch mechanism*

It is frequently desirable and necessary to be able to set up the machine so that if any columns on the main numerical value keyboard have all their keys in elevated positions, a cipher slot will be formed in the card in the area assigned to that particular column of keys. In the present invention, it is particularly desirable to slot through a card from the "1" perforation to a zero perforation disposed further inwardly from the margin of the card in alignment with the "1" perforation. Furthermore, at other times it is desirable to be able to leave certain areas of a card blank, that is, unnotched or unslotted, for allowing notching at a subsequent time. This operation may be referred to as a partial blanking of a card. To optionally allow the above described operations and results, a suitable mechanism is provided.

As was previously mentioned, die block 47 carries cipher punches 133 which are disposed above the numerical value punches 46 and receivable in and guided by horizontal recesses formed through the die block and separated from the lower punches by a wear plate 159.

The lower set of recesses in die block 47 are formed in the die block so that the lower surfaces of the numerical value punches will be substantially flush with or slightly lower than the transverse longitudinal card receiving groove 48 extending across the die block whereby, when the punches are driven rearwardly through the card receiving groove 48, the edges of the card engaged by the numerical value punches 46 will be notched and the cards will be slotted, not notched, by the cipher punches 133.

Cipher punches 133 have upwardly extending fingers or protrusions at their forward ends engageable with punch retractor 69 to enable retraction of the cipher punches 133 after they are driven into engagement with card A. Cipher punches 133 have downwardly opening notches formed therein for receiving guide wires or rods 161 which serve to retain the punches within the die block 47. Similar wires and upwardly opening notches 162 are provided for the numerical value punches 46, as is clearly shown in Fig. 15.

In the particular embodiment of the invention shown, there is one cipher punch for each column of keys 43 and, therefore, one cipher punch for each cipher punch actuating plate 129. Plates 129 are adapted when disposed horizontally to engage and drive the cipher punches 133 rearwardly through card A, as is apparent from Fig. 11, attention being directed to the cipher punch and plate in the background. Plates 129 under the influence of gravity will normally assume horizontal positions, but will be selectively tilted when numerical value keys in selected columns with which the plates are associated are depressed, since the punch actuators 55 associated with these keys 43 will be elevated by such setting of the keys to therefore elevate the plates associated therewith.

It follows from the above description that a card will be automatically slotted for zero in the areas assigned to a column of numerical value keys when no key in a particular column is depressed.

To allow for certain areas corresponding to the columns of numerical value keys to remain blank on the card for future coding, a plurality of cipher punch control levers 163, equal in number to the number of cipher punch actuating plates, are provided. Each control lever is notched at 163a and provided with a handle portion extending through an opening 129b formed in the associated cipher punch actuating plate, and through a slot formed in the reticulated face plate 144 (compare Figs. 1 and 14), to be exposed for manipulation by a person operating the machine.

Each cipher punch control lever 163 is beveled at 163b (compare Figs. 16, 17 and 18), to provide a relatively thin camming portion. Each cipher punch control lever 163 is pivotally mounted on punch bar 71 by a rivet 164 (see Fig. 14), for pivotal movement from a counter-clockwise position, as shown for the righthand cipher control lever 163 in Fig. 16, to a clockwise position as shown in the case of the lefthand control lever in Fig. 16. Cipher punch control levers 163 are adapted to be releasably retained in their counter-clockwise positions by the engagement of spring-pressed balls 165, carried by punch bar 71 (see Fig. 18), with indentations 163c formed in the cipher punch control levers 163.

There are a plurality of spring-pressed cipher punch actuating plate lifting plungers 166 also mounted in punch bar 71, being equal in number to the number of control levers and disposed in the path of travel of the camming portions of the cipher punch control levers 163 (see Fig. 16). When these spring-pressed lifting plungers 166 are released, by clockwise movement of the associated control levers, the plungers are operable to lift the associated cipher punch actuating plates 129 to inclined positions, as shown in the case of the plate 129 in Fig. 15, so that upon forward movement of the carriage 57 the forward edges of plates 129 do not engage cipher punches 133 and therefore leave the areas of the card corresponding to the selected control levers blank for future coding.

However, if it is desired to cipher slot certain selected areas in a card in which no value notches are to be formed, the column repeat keys 135 associated with the particular columns of numerical value keys which are not to be set are shifted inwardly or rearwardly to their inwardmost or rearwardmost positions to depress the associated plates from the position shown for the lefthand plate in Fig. 17 to a position to enable the associated control lever to be shifted to its counter-clockwise position and enable the camming portion thereof to engage the apex head of the associated plunger and cam the plunger slightly downwardly from its already depressed position and to retain the plunger in its downward position. This action allows the cipher punch actuating plate to assume a horizontal position unless one of the associated bank of punch actuators is elevated, therefore enabling the cipher punch actuating plate, when the carriage moves rearwardly, to drive its associated cipher punch through the card and therefore cipher punch the card to indicate that no numerical value keys in that particular column have been depressed or set.

By pivoting selected cipher punch control levers, selected areas of a card can be blanked, other areas left to be cipher punched or numerical value notched, depending on whether the associated columns of numerical value keys are depressed or left in elevated positions.

*Aligning pin arrangement*

As previously mentioned in the first part of this specification, a classification card may be inserted through slot 49 in the case cover 31 and disposed against the adjustable card positioning gauge 52 to dispose the areas of the card to be coded in alignment with their corresponding numerical value punches and in alignment with the cipher punches. However, to assure a precise alignment, an aligning pin 167 (best shown in Fig. 9) is provided and slidably received through a bore provided in die block 47, said aligning pin being secured at its forward end to the retractor 69. As shown in Fig. 9, when the machine is in a rest position the rearward aligning tapered nose of the aligning pin is disposed in slightly spaced relation with respect to the forward face of the classification card a distance substantially less than the horizontal distance between the punch engaging nose 55a of a punch actuator 55 and the rearward end of a numerical value punch 46. Therefore, during each cycle of operation, the aligning pin will first engage the card prior to the engagement of the punch actuators with the numerical valve punches to precisely align the card with the punches.

*Repeat motor control bar assembly*

It is frequently desirable to be able to punch or code a series of cards with precisely the same as a prior coding arrangement, that is, with exactly the same keys on the keyboard depressed. Mechanism to permit operation of the machine without restoring any of the keys to their elevated positions is provided and includes a repeat motor control bar 168, the stem of which is slidably supported for vertical movement by aligned slots (not shown) formed in keyboard guide plates 41 and 42. The repeat motor control bar stem carries a fixed laterally extending pin 168a (see Fig. 24) simultaneously engageable with control lever 106 and a repeat control lever 169. Repeat control lever 169 is fixedly secured at its forward end to one end of a pivot bar 171 which is pivotally supported by the protruding ends of rock shaft 107 (compare Figs. 7 and 9, and particular reference is invited to Fig. 24). Pivot bar 171 has a repeat lever 172 secured to its opposite end (compare Figs. 8 and 24) which repeat lever at its rearward end is provided with a fixed laterally extending pin 172a disposed closely adjacent to a forward extension 152b formed on restorer bar actuator 152 (see Fig. 8).

When repeat motor control bar 168 is depressed, both motor control levers 106 and 169 are depressed to energize motor 81 through the medium of micro-switch 125, and simultaneously repeat lever 172 is also depressed and the pin 172a thereon operates to move the restorer bar actuator 152 rearwardly from the position shown in Fig. 8 to the position shown in Fig. 23, to misalign the hook 152a on the restorer bar actuator with pin 153a on restorer lever 153. Therefore, when pin 153a is depressed during operation of the carriage 57 by cam 154, it is incapable of pulling the restorer bar actuator 152 downwardly so that the restorer bar 145 remains in its inoperative position (shown in Fig. 23) leaving all the numerical value keys which have been depressed and set in their selected depressed positions, thereby enabling a repeat coding of an identical nature to be carried out on the succeeding card or as many succeeding cards as is desired. It is obvious that a depression of the main motor control bar 108 will result in leaving hook 152a in alignment with pin 153a and therefore the keyboard will be cleared upon the termination of a cycle of operation so initiated.

The numerical value keyboard may be provided with a plurality of indicators 173, there being one between each pair of adjacent columns. Each indicator is differently colored on its opposite sides and pivotally supported at its ends by notches in the upwardly extending ends of guide plate 41. Each indicator has a serrated disc 173a exposed by a slot in face plate 45 to enable manipulation of the indicator. A tension spring 174, secured at its ends to studs 174b (see Fig. 8), engages over-center pins 173b on the indicators to retain the indicators in the positions in which they are set. These indicators are useful in visually separating the columns of numerical value keys from one another to assist in operating the machine during partial repeat operations and the like.

*Operation of machine*

Figure 2:
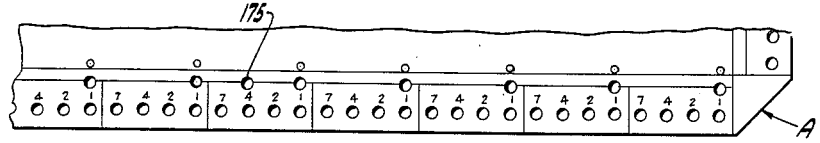
Figs. 2, 3, 4 and 5 are different views of a card edge, the card edges in Figs. 3, 4 and 5 having been notched and/or slotted by the machine disclosed in Fig. 1.

The operation of the various parts of the machine has been explained along with the detailed explanation and hence need only be summarized in connection with the punching of a card such as shown in Figs. 2, 3, 4 and 5. Fig. 2 shows the edge of a card prior to coding thereof. Each card is provided with an alignment hole 175 adapted to be disposed in approximate registry with aligning pin 167 when the card is inserted into the machine and disposed against adjustable gauge 52. Merely for purposes of illustration and obviously not intended to represent a practical operation of the machine, the card A disclosed in Fig. 2 can be inserted in the machine and the machine operated without any coding of the card by leaving all the numerical value keys 43 in their elevated unset positions and shifting all the cipher punch control levers 163 so as to release lifting plungers 166 and therefore allow the plungers to tilt the plates 129 to the position shown for plate 129 in Fig. 15. Obviously, since none of the punch actuators 55 have been elevated and since all plates 129 have been elevated, upon a forward movement of carriage 57 none of the punches, either the numerical value punches 46 or the cipher punches 133 are engaged and therefore the card remains unnotched.

Figure 3:
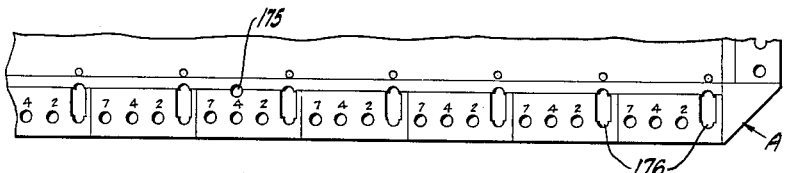

Fig. 3 shows the card disclosed in Fig. 2 as having been inserted into the machine and the machine operated with none of the numerical value keys 43 depressed, but with the lifting plungers 166 inactivated by operation of cipher punch control levers 163 to free plates 129 from the influence of lifting plungers 166. Plates 129 therefore assume horizontal positions and upon rearward movement of carriage 57 operate to driver cipher punches 133 through the card to cipher slot the card.

Figure 4:
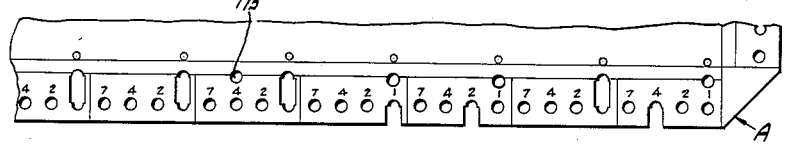

In Figs. 2, 3, 4 and 5 only seven punching areas have been disclosed, but it is obvious that the cards could have more or less punching areas and that the punching machine could have more or less columns of numerical value punches. For coding the card in the manner as shown in Fig. 4, the four righthand columns of numerical value keys 43 on the machine are utilized and the remaining five columns to the left are unset. For coding "1204," the first (reading from left to right) of the four just mentioned columns has the "1" numerical value key thereof depressed, the second of the aforementiond four columns has the "2" numerical value key depressed and set, the third column of the identified four columns is left in elevated condition, and the fourth column of keys has the "4" numerical value key depressed. The lifting plungers 166 for all the columns are inactivated. Upon a depression of either of the motor control bars, the numerical value punches associated with the numerals "1," "2" and "4" will be driven through the correct areas of the card, and the cipher punches associated with the remaining columns in which all the keys remain in elevated condition will be driven through their associated areas so as to punch out the card material between the zero perforation and the "1" perforation in each of the areas.

Figure 5:
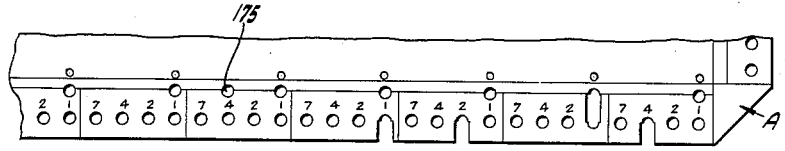

Fig. 5 shows the card disclosed in Fig. 2 as having been coded by the machine, when the machine has been set up to blank the lefthand five areas of the card and to code the righthand four areas of the card, only three of the lefthand five columns being shown. To obtain this result, the cipher punch control levers 163 for the lefthand five columns of numerical value keys are moved to activate the associated lifting plungers 166, which plungers operate to lift the associated cipher punch actuating plates 129 to prevent engagement thereof with the associated cipher punches. The number "1204" is set on the righthand four columns of numerical value keys and when the machine is operated, the lefthand five areas of the card will be blank for future coding and whereas the righthand four columns will be coded for "1204."

By the present invention, a machine has been provided which is extremely versatile in operation and which can be set up for automatically cipher punching all areas in a card, with respect to which all the keys of the associated columns of keys remain unset and elevated. Therefore, the machine does not have to be manually set for a cipher slotting operation, but is automatically set for cipher slotting by the mere absence of the setting of a key in a numerical value key column.

Another obvious advantage of the present invention is that certain areas of the card can be blanked by activating the associated lifting plungers, allowing the card to be punched in the remaining areas. The blank areas can be subsequently coded or punched.

Another main advantage of the machine of the present invention is that by operating the repeat motor control bar, the entire previous coding pattern can be again coded on a subsequent card or cards, as many as desired so long as the repeat motor control bar is depressed. Furthermore, the entire board can be cleared by merely depressing the main motor control bar.

A still further advantage of the machine of the present invention is the provision of column repeat keys in which the settings of selected columns of numerical value keys can be repeated again and again on a series of cards but allowing the unselected columns of keys to be elevated and restored to unset positions to enable a different setting of the unselected columns. Furthermore, when the column repeat keys are shoved inwardly or rearward to their inwardmost positions, they will allow for correction of errors in setting of the numerical value keys prior to a punching operation, each column repeat key serving to elevate all the keys of its column when said column repeat key is individually moved inwardly or rearward to its extreme inward or rearward position.

A further advantage of the machine of the present invention is that by provision of the adjustable card positioning gauge 52 and the aligning pin 167 movable with carriage 57, the cards may be precisely aligned with the punches so as to accurately locate the coding notches and slots with respect to the areas of the card.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A device of the class described comprising a plurality of coding zones, each coding zone having a plurality of digit punches and a zero punch, means for selectively conditioning each of the digit punches for actuation, means for automatically conditioning the zero punch for actuation, means for rendering said last-mentioned means inoperative upon actuation of at least one of the digit conditioning means, means for simultaneously actuating all of the punches conditioned for actuation, and means for selectively manually rendering any of said zero punch conditioning means inoperative regardless of whether any of the digit conditioning means associated therewith is operated.

2. In a device as set forth in claim 1, means for restoring said conditioning means to their original unset position after each cycle of said punch actuating means.

3. In a device as set forth in claim 2, means for selectively rendering said restoring means for any one coding zone inoperative.

4. A device of the class described comprising a punching station, two sets of selectively conditionable punches, a keyboard having a plurality of setting keys arranged in a plurality of rows each being operatively associated with one of the punches in the first set of punches, whereby said punches may be selectively conditioned for operation, said second set of punches comprising one punch associated with each row of keys on said keyboard, separate means for automatically conditioning each of said punches in said second set of punches for action, means for rendering each of said last-mentioned means inoperative upon actuation of any one of the keys in the row associated therewith, means for simultaneously actuating all of said punches conditioned for actuation, and means for selectively manually rendering any of said means for conditioning the punches of said second set of punches inoperative regardless of whether any of the setting keys in the row of keys associated therewith is operated.

5. In a device as set forth in claim 4, means for restoring said punch conditioning keys to their original unset position after each cycle of said punch actuating means.

6. In a device as set forth in claim 5, means for selectively rendering said restoring means inoperative for any one row of keys.

7. A device of the class described comprising a punching station, two sets of punches adapted to punch a card positionable in said punching station, a keyboard having a plurality of settable keys arranged in a plurality of rows each row corresponding to a coding zone on said card, a carriage having mounted thereon a first set of punch actuators equal in number to the number of keys on said keyboard, means connecting each of said first set of punch actuators to a key on said keyboard for actuation thereby from an inoperative to an operative position, each of said first set of actuators when activated by its key to its operative position adapted to contact a punch in said first of said sets of punches to cause said punch to punch said card upon actuation of said carriage, the second of said sets of punches having a plurality of zero punches equal in number to the number of rows on said keyboard, a second set of punch actuators on said carriage equal in number to the number of punches in said second set of punches, said second set of actuators being normally positioned to actuate said zero punches upon actuation of said carriage, means on each of said first punch actuators for moving the second punch actuators associated with the column containing said first actuator to inactive position when said first actuator is moved to operative position, means to actuate said carriage, and means for selectively manually rendering any of said zero punch actuators inoperative regardless of whether any of the first set of actuators associated therewith is operated.

8. In a device as set forth in claim 7, means for restoring said first set of actuators to their original unset position after each cycle of said carriage actuating means.

9. In a device as set forth in claim 8, means for selectively rendering said restoring means for any one row of actuators inoperative.

References Cited in the file of this patent

UNITED STATES PATENTS

| | | |
|---|---|---|
| 1,061,883 | Tily et al. | May 13, 1913 |
| 1,778,155 | Hildreth | Oct. 14, 1930 |
| 1,800,375 | Carroll | Apr. 14, 1931 |
| 2,035,777 | Welk | Mar. 31, 1936 |
| 2,062,155 | Welk et al. | Nov. 24, 1936 |
| 2,318,446 | Walters | May 4, 1943 |